Oct. 12, 1943.   E. COWLES   2,331,455
PROCESS FOR THE PREPARATION OF PAPER STOCK
Filed June 9, 1937
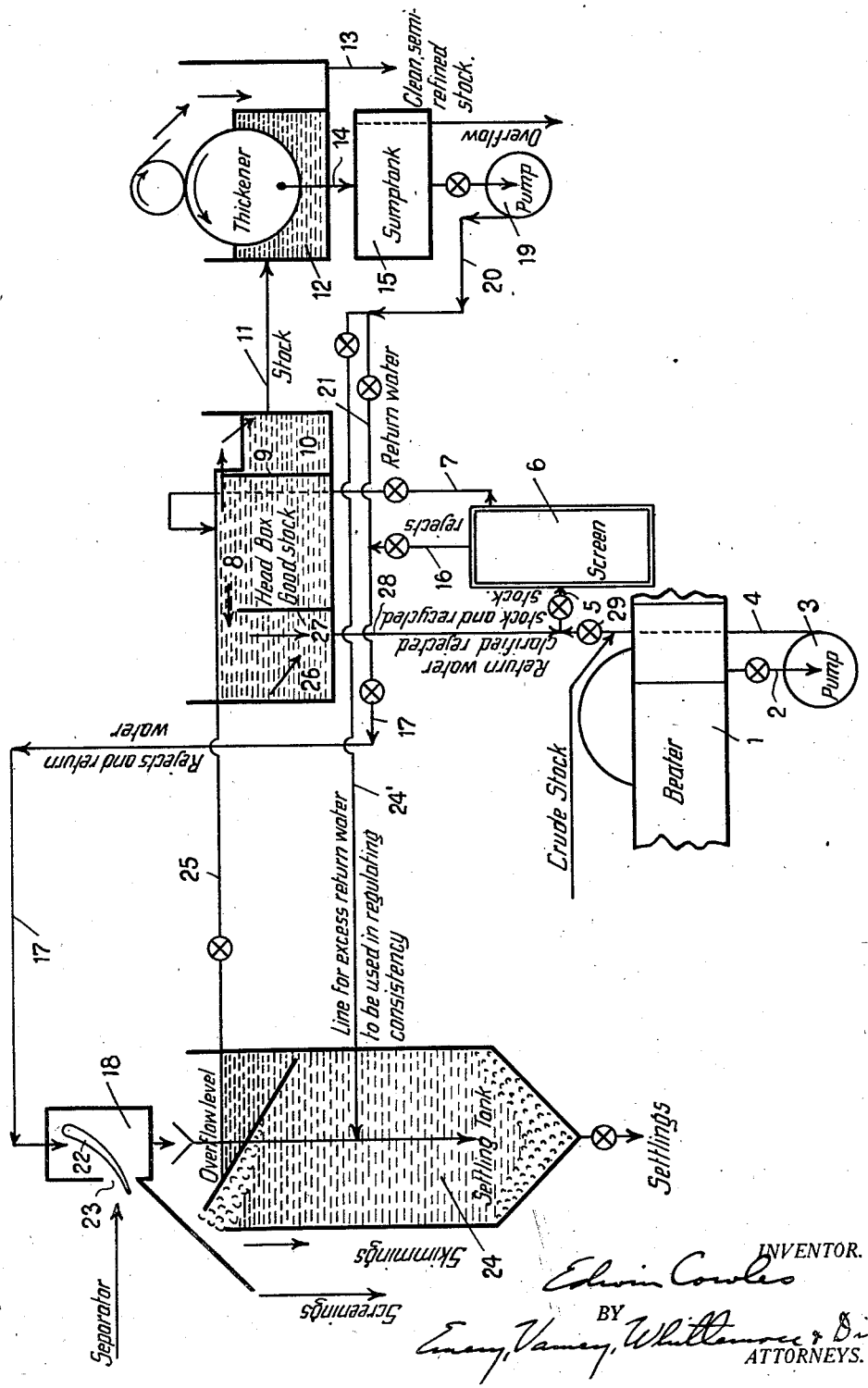

Patented Oct. 12, 1943

2,331,455

UNITED STATES PATENT OFFICE 2,331,455

PROCESS FOR THE PREPARATION OF PAPER STOCK

Edwin Cowles, Hopewell, N. J., assignor to The Cowles Company, Princeton, N. J., a corporation of New Jersey Application June 9, 1937, Serial No. 147,211

3 Claims. (Cl. 92—20)

This invention relates to processes for treating paper making materials and particularly for treating waste paper for the preparation of fibrous pulp or stock suitable for use in the manufacture of paper, board and the like.

This application is filed as a continuation in part of my copending application Serial No. 27,605, filed June 20, 1935.

Waste paper used for this purpose is mixed with considerable trash and dirt of all kinds, and one of the problems in preparing stock from waste paper is the elimination of trash and dirt. In the usual processes for preparing such stock the waste paper is placed in a breaker beater with sufficient water to reduce the consistency to approximately 3% to 5%. After the waste paper is partially defibered, the resulting pulpy mass or stock, still containing considerable quantities of trash and dirt, is removed from the breaker beater and mixed with additional water sufficient to reduce the consistency to approximately 1%. This thinned stock is then led to a settling trough where extraneous trash of high specific gravity such as metal objects, glass, sand, etc., are settled out, following which it is led to a screen (still at a consistency of approximately 1%) where suspended trash such as strings, rope, Cellophane, etc., are removed. The fibrous stock which passes through the screen is then led to a thickener where the consistency is raised to approximately 5%, after which the thickened stock is refined in beaters or Jordans before being used.

Processes of this type have several disadvantages. They require a great deal of expensive equipment in the form of screens, settling troughs and thickeners, and, since the waste paper is only partially defibered in the breaker beater, there is a considerable loss of good stock in the screening operation. A considerable amount of undefibered material also passes through the screens and has to be defibered subsequently in the beaters or Jordans.

Essentially, the prior processes have comprised treating the entire body of stock emerging from the breaker beater to remove therefrom successively, first, the heavy trash, and second the suspended or light trash and undefibered material, leaving a residue of clean defibered material. According to the present process, on the other hand, clean defibered material is withdrawn directly from the main body of stock, leaving a residue consisting of both heavy and light trash and undefibered material. The waste paper to be treated is prepared in any suitable manner, as by a breaker beater, and the crude stock is then submitted to a combined screening and centrifugal action which separates clean defibered material from both light and heavy types of trash and undefibered material and also exerts a defibering and refining action on the stock. In order to obtain efficient action, the consistency of the stock entering the screen should be less than 3%, and if the main body of stock is prepared at a higher consistency, it should be thinned accordingly. The clean defibered stock which emerges may be used directly for paper making or, if desired, may be passed to beaters, Jordans or other refining apparatus for additional refining before being used.

The residue rejected by the screen is greatly thinned with additional water, preferably by mixture with the return water from the thickener, to a consistency preferably as low as .2% to .6%. This residue, which contains some defibered material, some undefibered material and trash, is then treated to separate the useful material including defibered material and undefibered material from trash. For this purpose, the residue is led to a separating device adapted to separate light trash and large pieces of heavy trash from useful fibrous material. An ordinary screen may be used for this purpose, although I prefer to use a separator of a type hereinafter referred to. The separating action at this stage need not be complete, for as hereinafter explained, any trash passing through will be recycled and may be removed during a later passage.

The fibrous material and water separated from the trash may still contain a considerable amount of undesirable small heavy trash such as sand and dirt, and accordingly it is led to a settling tank where solid materials of high specific gravity are settled out and materials of low specific gravity such as tar may be skimmed off. In view of the very low consistency of the material entering the tank, an efficient settling action is obtained. Material may be withdrawn continuously from the settling tank and this material is returned to the screen hereinbefore referred to. Since the material returned from the settling tank is of very low consistency, it may be used to reduce the consistency of the new stock entering the screen without adding additional water. If desired, some of the good stock passing from the screen may also be recirculated along with the said material.

From the foregoing, it will be observed that there is a direct withdrawal in the screen of clean defibered material leaving a residue of light and heavy trash and undefibered material. Furthermore there is a continuous re-cycling of the residue with intermediate removal of both light and heavy trash. Thus, whereas in prior processes the trash was removed from the main body of stock, in the present process clean defibered material is removed from the main body, and the trash is removed from the relatively small residue remaining after the withdrawal of the clean defibered material. For this reason the apparatus for separating the trash may be less elaborate than in prior processes.

A preferred embodiment of the invention is illustrated in the accompanying drawing in which the figure is a diagrammatic illustration in the form of a flow sheet.

Referring to the drawing, the raw waste paper is introduced to the breaker beater 1 to which sufficient water is added to reduce the consistency to approximately 3% to 5%. The stock is partially defibered in the breaker beater, and the partially defibered stock is drawn through the pipe 2 by a pump 3 which forces the stock through the pipe 4 and pipe 5 to a screen 6. The said screen may be of any desired type capable of withdrawing clean defibered material, but is preferably constructed and operated in accordance with the disclosure of my prior Patent No. 2,033,123, dated March 10, 1936, comprising essentially a perforated screen and a rotating impeller having vanes continuously sweeping said screen for purposes set forth in said patent. As explained in said patent, the action is such as to permit only clean defibered material to pass through the screens, for the combination of the screening action with the centrifugal action prevents both light and heavy trash as well as undefibered material from passing through the screens. The defibered stock from the said screen may be used directly for paper making purposes, or may be conducted to a thickener, preferably via a pipe 7 leading to a head box 8 having a dam 9 over which the stock flows into a compartment 10 from which it flows through the pipe 11 to a thickener 12 of conventional construction. The thickened stock at approximately 4% to 5% consistency is removed from the thickener through the pipe 13 and the water which is extracted flows through a pipe 14 into a sump tank 15.

The rejected stock or residue from the screen 6 is forced through the pipes 16 and 17 to the separator 18, but before reaching the separator, the residue is greatly thinned by the addition of water from the sump tank 15, which is pumped by the pump 19 through the pipes 20 and 21 which are connected with the pipe 17. As previously stated, it is preferable to add sufficient water to reduce the consistency of the residue to from .2% to .6% consistency. The remaining water from the sump tank may be returned to the settling tank 24 through the pipe 24' and used to control the consistency therein. In this manner, all of the water from the thickener is returned to the settling tank either directly through pipe 24' or through the pipe 17 and separator 18.

The separator 18 may be of any desired type, but is preferably made in accordance with the disclosure of my copending application for Letters Patent, Serial No. 27,604, filed June 20, 1935, and comprises essentially a plurality of inclined spaced blades 22 which extend through the flow from the pipe 17 and eject the trash through the opening 23. As previously pointed out, this separator is not required to effect a perfect separation, for any trash which fails to separate out is re-cycled and removed later. It should be noted, however, that because of the extremely low consistency of the material flowing through the separator, there is very little loss of fibrous material. The remaining water and fibrous stock flow into the settling tank 24 which may be conveniently arranged underneath the separator 18. The overflow from the settling tank, consisting of water and partially defibered stock, is returned to the screen 6, but is preferably conducted through the pipe 25 to the compartment 26 which may be conveniently formed as a part of the head box 8, being separated therefrom by the dam 27. The compartment 26 is connected to the screen 6 by the pipe 28 and pipe 5. It will be observed that with this arrangement, partially defibered stock returned from the settling tank may, if desired, be mixed with good fibrous stock and then mixed with any desired proportion of new stock, the rate of flow of the latter being controlled by controlling the speed of the pump 3 and the opening of the valve 29.

According to the present process in which there is an initial withdrawal in the screen 6 of clean defibered stock it is possible to secure an improved quality of defibered material which is cleaner than in prior processes in which the trash is withdrawn from the stock. It will also be observed that since only the residue of rejected stock is clarified, much less equipment is required than in the ordinary processes where all of the stock is required to be clarified. Furthermore, since fibrous material, which is rejected in its first passage through the screen is continuously re-cycled via the separator and settling tank and back to the screen, there is practically no loss of useful fibrous material, for any undefibered material which is introduced from the breaker beater is gradually defibered during its circulation through the screen and is withdrawn as defibered material.

It will be understood that the invention may be variously modified and embodied within the scope of the subjoined claims.

I claim as my invention:

1. Process for the treatment of waste paper containing both light and heavy trash for the preparation of paper stock, which comprises partially defibering the waste paper to form a pulpy mass, withdrawing a major portion of said mass directly in the form of substantially clean defibered material leaving a single residue of relatively small volume containing a mixture of partially defibered material, and both light and heavy trash, removing both light and heavy trash from said residue, and re-cycling the remainder of partially defibered material for the separation of additional defibered material.

2. Process for the treatment of waste paper containing light and heavy trash for the preparation of paper stock, which comprises partially defibering the waste paper to form a pulpy mass, withdrawing a major portion of said mass directly in the form of substantially clean defibered material leaving a single residue of relatively small volume containing a mixture of partially defibered material, and both light and heavy trash, thinning said residue, removing both light and heavy trash from said residue while thinned, and re-cycling the remainder of partially defibered material for the separation of additional defibered material.

3. Process for the treatment of waste paper containing both light and heavy trash for the preparation of paper stock, which comprises partially defibering the waste paper to form a pulpy mass, withdrawing a major portion of said mass directly in the form of substantially clean defibered material by subjecting the same to a combined screening and centrifugal action, leaving a single residue a relatively small volume containing a mixture of partially defibered material and both light and heavy trash, removing both light and heavy trash from said residue, and re-cycling the remainder of partially defibered material for the separation of additional defibered material.

EDWIN COWLES.